United States Patent [19]

Sata

[11] Patent Number: 5,079,468
[45] Date of Patent: Jan. 7, 1992

[54] MINIATURE MOTOR WITH REVOLUTION-DETECTING GENERATOR

[75] Inventor: Nobuyuki Sata, Matsudo, Japan

[73] Assignee: Mabuchi Motor Co., Ltd., Chiba, Japan

[21] Appl. No.: 557,317

[22] Filed: Aug. 31, 1990

[30] Foreign Application Priority Data

Sep. 11, 1989 [JP] Japan .................................. 1-106508

[51] Int. Cl.$^5$ ...................... H02K 11/00; H02K 3/00; G01P 3/48
[52] U.S. Cl. .................................... 310/168; 310/113; 310/208; 310/268; 324/174; 324/207.12
[58] Field of Search ................ 310/168, 268, 113, 114, 310/171; 324/174, 207.12

[56] References Cited

U.S. PATENT DOCUMENTS

| 3,967,200 | 6/1976 | Tetsugu et al. | 310/168 |
| 4,174,484 | 11/1979 | Schmider | 310/268 |
| 4,366,405 | 12/1982 | Schmider | 310/268 |

Primary Examiner—Steven L. Stephan
Assistant Examiner—D. L. Rebsch
Attorney, Agent, or Firm—McGlew & Tuttle

[57] ABSTRACT

A miniature motor with a revolution-detecting generator, the motor having a stator formed by a permanent magnet on the motor housing and a rotor consisting of a winding on a core. Electric current is fed to the rotor winding via current feeding brushes and a commutator. A revolution-detecting generator comprising a frequency-detecting coil for receiving changes of magnet flux made by teeth on stator and rotor components generates an induced voltage proportional to the revolution of the rotor, in which a noise-suppressing coil wound in a lapped state with the frequency-detecting coil is provided. The noise-suppressing coil and the frequency-detecting coil are connected with each other in a reverse phase, and the noise-suppressing coil is connected in parallel with the frequency-detecting coil via a high-pass filter connected in series.

6 Claims, 4 Drawing Sheets

FIG. I
(PRIOR ART)
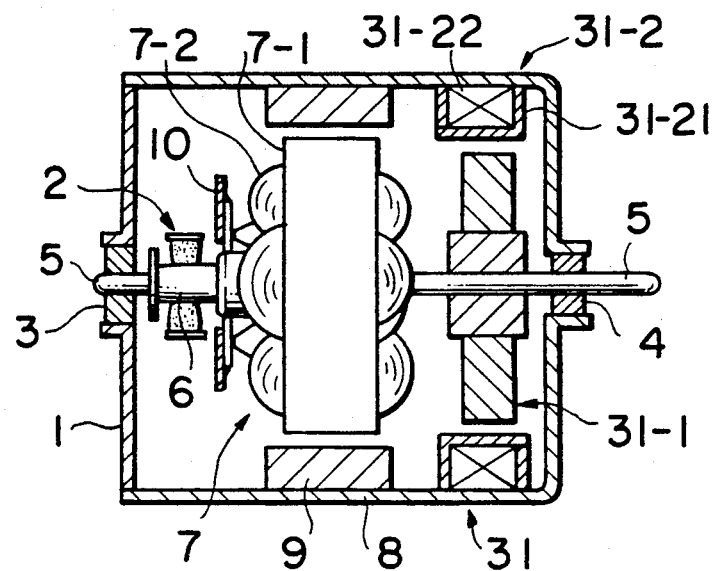
FIG. 2
(PRIOR ART)
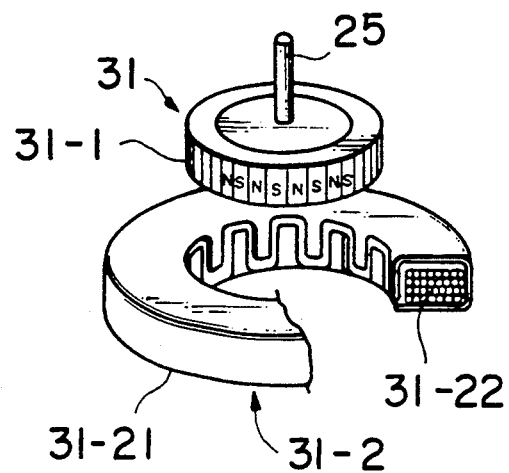

MINIATURE MOTOR WITH REVOLUTION-DETECTING GENERATOR

BACKGROUND OF THE INVENTION

This invention relates generally to a miniature motor with a revolution-detecting generator, and more specifically to a miniature motor with a revolution-detecting generator having a revolution-detecting generator for detecting the revolution of a miniature motor used for driving the capstan of a small-sized tape recorder comprising a frequency-detecting coil and a noise-suppressing coil, these coils mounted together in a lapped state; the noise-suppressing coil being connected in parallel with the frequency-detecting coil via a high-pass filter in a reversed phase.

DESCRIPTION OF THE PRIOR ART

Heretofore, a miniature motor is publicly known, in which a revolution-detecting generator, or freqency generator (FG) as often called in the prior art, is incorporated in a standard miniature motor. That is, a miniature motor with a revolution-detecting generator, as shown in FIG. 1, comprising a rotor (hereinafter referred to as FG rotor) having a plurality of magnetic-pole serrations, a stator (hereinafter referred to as FG stator) having a plurality of magnetic-pole serrations provided in such a manner as to face the FG rotor magnetic-pole serrations, a permanent magnet (hereinafter referred to as FG magnet) for forming a magnetic field between the FG rotor magnetic-pole serrations and the FG stator magnetic-pole serrations, a frequency-detecting coil (hereinafter referred to as FG coil) generating an induced voltage proportional to the revolution of the rotor, responding to changes in the magnetic field is publicly known. FIG. 1 is a longitudinal section of the essential part of a prior-art miniature motor having a revolution-detecting generator; FIG. 2 is a partially cutaway perspective view of assistance in explaining the revolution-detecting generator used in the prior art shown in FIG. 1.

In FIG. 1, electric current is fed to a rotor coil 7-2 wound on a rotor core 7-1 of a rotor 7 via brushes 2 held by a brush holder (not shown) made of a synthetic resin which is fitted to an end plate 1 and via a commutator 6 fixedly fitted to a motor shaft 5 supported by bearings 3 and 4. By feeding electric current to a rotor coil 7-2 in this manner, the rotor 7 is caused to rotate in the field formed by a field magnet 9 fixedly fitted to the inner circumferential surface of a motor housing 8. Numeral 10 in the figure denotes a disc varistor formed in a ring shape for quenching sparks likely to be generated by the brushes 2.

Moreover, a space for a revolution-detecting generator 31 is provided by extending the motor shaft 5 in the direction of the bearing 4, and increasing the length of the motor housing 8 in the direction of the motor shaft corresponding to the extension of the motor shaft 5. The revolution-detecting generator 31 is housed in the space thus enlarged. The revolution-detecting generator 31 consists of an FG rotor 31-1 and an FG stator 31-2. As shown in FIG. 2, the FG rotor 31-1 is formed in such a manner that multi-pole magnetizing magnets are disposed on the outer periphery thereof. The FG stator 31-2 consists of a comb-teeth-shaped core 31-21 disposed in such a manner as to face the outer circumferential surface of the FG rotor 31-1, and an FG coil 31-22 wound on the comb-teeth-shaped core 31-21.

With the aforementioned construction, as the motor is driven and the FG rotor 31-1 is also caused to rotate, the polarity of the magnetic poles on the FG rotor 31-1 facing the comb teeth of the FG stator 31-2 is substantially repeatedly reversed. This causes the direction of magnetic flux crossing the FG coil 31-22 to change, corresponding to the substantial reversal of the polarity of the FG rotor 31-1, thus generating an induced voltage in the FG rotor 31-22. Since the induced voltage has a frequency proportional to the revolution of the FG rotor 31-1, motor revolution can be detected by measuring the frequency of the induced voltage in the FG coil 31-22.

Although the construction and operation of the prior art shown in FIG. 1 have been described in the foregoing, the prior art shown in FIG. 1 has such a construction that a space for housing the revolution-detecting generator 31 is provided by extending the motor shaft 5, and increasing the length of the motor housing 8 in the direction of the motor shaft corresponding to the extension of the motor shaft 5. That is, a space exclusively used for mounting the revolution-detecting generator 31 in the motor is required. This poses an unwanted problem of increasing the size of the motor in the direction of the motor shaft.

To solve the aforementioned problem, the present Applicant proposed "A miniature motor having a frequency generator (Utility Model Application No. 61897-1988)" as shown in FIGS. 3 and 4, to which this invention is directed. FIG. 3 is a structural diagram of a miniature motor having a frequency generator as proposed in the above proposal. FIG. 4 is a diagram of assistance in explaining the state where the FG coil in the prior art shown in FIG. 3 is installed. Like parts are indicated by like reference numerals in FIG. 1. Numeral 11 in the figure denotes an FG rotor, which is made of a ring-shaped soft magnetic material disc having serrations (not shown) on the outer periphery thereof; 12 an FG stator; 13 and 14 frequency-detecting signal output terminals; 15 a brush holder for holding brushes 2, fixedly fitted to the end plate 1 between the FG magnet 12-2 and the motor housing 8, and other numerals correspond to those shown in FIG. 1.

In FIGS. 3 and 4, the FG rotor 11 is fixedly fitted to the disc varistor 10 and caused to rotate together with the rotor 7. The FG stator 12 is made of a ring-shaped soft magnetic material disc, and consists of an internal gear-shaped core 12-1 on which serrations or teeth (not shown) having the same circumferential pitch as that of the serrations on the FG rotor 11 are formed on the inner periphery thereof; a pair of FG magnets 12-2 fixedly fitted to the inner surface of the end plate 1; and an FG coil 12-3 wound over the inner circumferential surface of the motor housing 8 and the FG magnet 12-2. The internal gear-shaped core 12-1 is fixedly fitted to the motor housing 8 using an adhesive in such a manner as to come in close contact with the inner circumferential surface of the motor housing 8.

The prior art shown in FIGS. 3 and 4 is proposed to take advantage of the fact that there is an unused space above and below the brushes 2 and the commutator 6. That is, the motor dimensions are prevented from being increased by disposing the frequency generator in that space, thus making the external dimensions of a miniature motor with a frequency generator the same as those of a miniature motor without a frequency generator. In FIGS. 3 and 4, the magnetic circuit in the frequency generator comprising the FG rotor 11 and the FG stator 12 is formed by a route consisting of FG magnet 12-2→FG rotor 11→internal gear-shaped core 12-1→motor housing 8→end plate 1→FG magnet 12-2. That is, as the FG rotor 11 is caused to rotate by motor rotation, magnetic fluxes change in accordance with the change in magnetic resistance in the gap between the FG rotor 11 and the internal gear-shaped core 12-1 of the FG stator 12. This in turn generates an induced voltage having a frequency corresponding to the change in magnetic flux in the FG coil 12-3. Since the frequency of the induced voltage is proportional to the revolution of the FG rotor 11, motor revolution can be detected by measuring the frequency of the induced voltage in the FG coil 12-3.

In the prior-art shown in FIGS. 3 and 4, to which this invention is directed, the FG coil 12-3 not only intercepts the magnetic flux of the FG magnet 12-2, but also intercepts the magnetic flux of the field magnet 9 of the miniature motor. That is, the FG coil 12-3 crosses the magnetic flux of the field magnet 9 via a route formed by the field magnet 9, the rotor 7, the FG rotor 11, the FG magnet 12-2, the end plate 1, the motor housing 8 and the field magnet 9. This poses an unwanted problem of the adverse effect of the changes in the magnetic flux of the field magnet 9 on the FG signal output generated in the FG coil 12-3. That is, as shown in FIGS. 5 and 6 showing the FG signal output waveform (shown by arrow a) generated in the FG coil 12-3, noise (shown by arrow b) is superposed on the FG signal output waveform of the FG coil 12-3. FIG. 6 is a waveform diagram in which the time axis between $t_1$ and $t_2$ in FIG. 5 was enlarged; arrow c in the figure indicating a noise waveform. A similar problem arises with the prior art shown in FIG. 1.

To solve the aforementioned unwanted problem, a means for magnetically shielding the frequency generator portion to separate from the motor portion is considered. But this is not practical because this arrangement could make it difficult to reduce the size of the entire unit, leading to increase cost.

As shown in FIG. 7, an arrangement for suppressing the noise generated in the FG coil 12-3 is considered by providing a noise-suppressing coil C connected in such a manner that the noise-suppressing coil C is connected in parallel with and in reverse to the FG coil 12-3. In this case, the noise-suppressing coil C has to be adapted to cross only the magnetic flux of the field magnet 9 which crosses the FG coil 12-3. It can be said, however, that such an arrangement is considered virtually impossible.

SUMMARY OF THE INVENTION

It is the first object of this invention to provide a miniature motor with a revolution-detecting generator that can obtain a high quality frequency-detecting signal from a frequency-detecting coil.

It is the second object of this invention to provide a miniature motor with a revolution-detecting generator that can reduce the size and manufacturing cost of the motor.

BRIEF DESCRIPTION OF THE DRAWINGS

FIG. 1 is a longitudinal sectional view of the essential part of a prior-art revolution-detecting generator.

FIG. 2 is a partially cutaway perspective view of assistance in explaining the contruction of the revolution-detecting generator shown in FIG. 1.

DETAILED DESCRIPTION OF THE INVENTION

Figure 8:
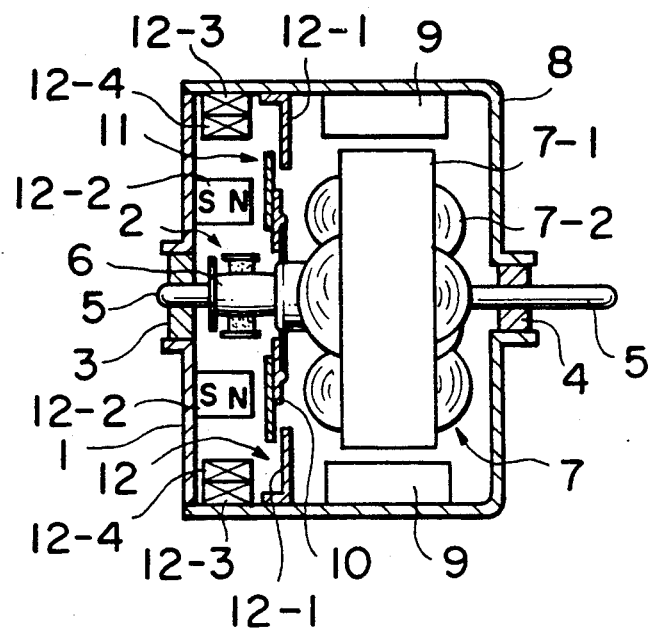
FIG. 8 is a longitudinal section illustrating the essential part of an embodiment of this invention.

FIG. 8 is a longitudinal section illustrating the essential part of an embodiment of this invention.

Figure 9:
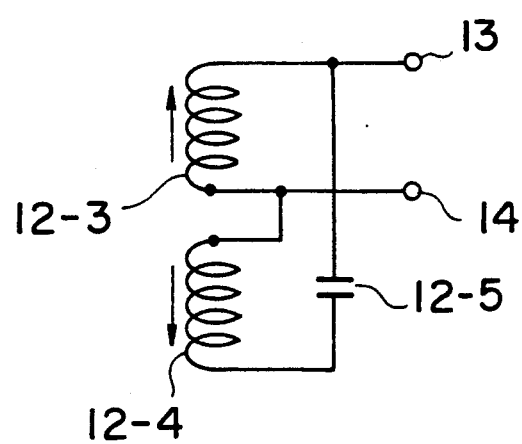
FIG. 9 is a electric wiring diagram of assistance in explaining the connection between the frequency-detecting coil and the noise-suppressing coil in FIG. 8.

FIG. 9 is a electric wiring diagram of assistance in explaining the connection between the frequency-detecting coil and the noise-suppressing coil in FIG. 8.

Figure 3:
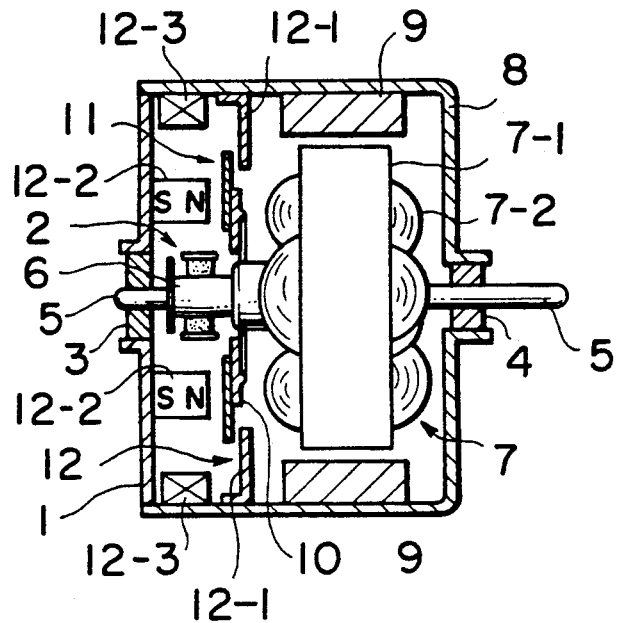
FIG. 3 is a longitudinal section of the essential part of an improved version of the prior-art.
Figure 4:
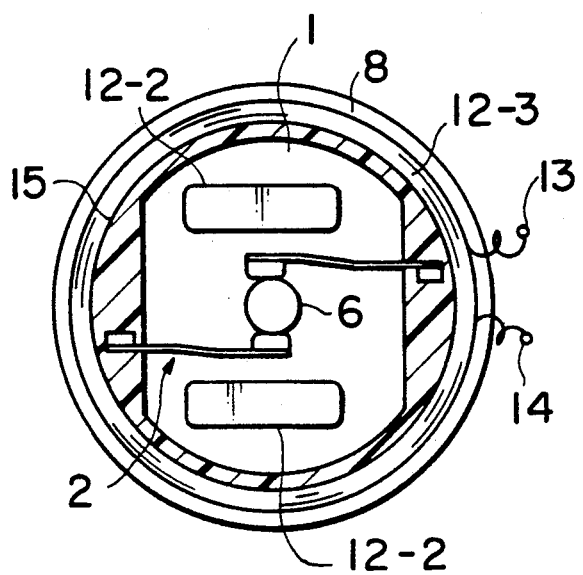
FIG. 4 is a partially cross-sectional diagram of assistance in explaining the installation of the frequency-detecting coil shown in FIG. 3.

In the figures, reference numeral 12-4 refers to a noise-suppressing coil, and other numerals correspond to like numerals in FIGS. 3 and 4.

The embodiment shown in FIG. 8 is based on the previous proposal shown in FIGS. 3 and 4.

Consequently, this invention is basically similar to the prior art shown in FIGS. 3 and 4, except that a noise-suppressing coil 12-4 wound in a lapped state with the frequency-detecting or frequency generating coil (FG coil) 12-3 is provided. As will be described later with reference to FIG. 9, the FG coil 12-3 and the noise-suppressing coil 12-4 are connected with each other in a reversed phase, and the noise-suppressing coil 12-4 is connected in parallel with the FG coil 12-3 via a capacitor 12-5 connected in series with the noise-suppressing coil 12-4. In the following, the connection between the FG coil 12-3 and the noise-suppressing coil 12-4 will be described, referring to FIG. 9.

Figure 5:
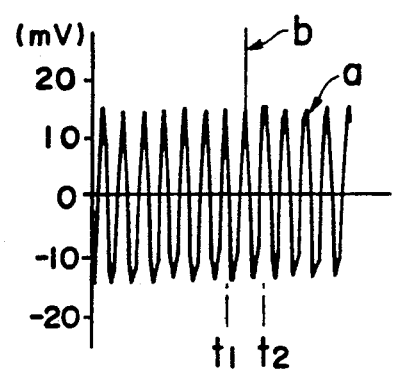
FIG. 5 is a diagram of assistance in explaining a typical example of the detecting signal output waveform in the prior art.
Figure 6:
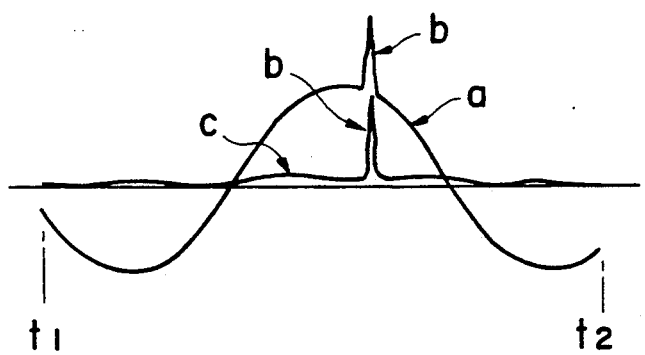
FIG. 6 is a diagram of assistance in explaining an output waveform in which the time axis between $t_1$ and $t_2$ in FIG. 5 was enlarged.
Figure 7:
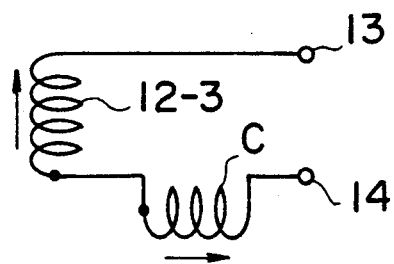
FIG. 7 is a diagram of assistance in explaining the a means for suppressing the noise that is likely to be generated in the frequency-detecting signal.

In FIG. 9. a capacitor 12-5 is connected in series with the noise-suppressing coil 12-4. The capacitor 12-5 is used for transmitting only higher frequencies corresponding to the frequency of the noise b as described with reference to FIGS. 5 and 6 above. Consequently, the capacitance of the capacitor 12-5 is set as follows:

The capacitance of the capacitor 12-5 is set so that "$|Z_L| >> |Z_C|$" in the noise frequency region, and "$|Z_L| << |Z_C|$" in the FG signal frequency region where the impedance of the noise-suppressing coil 12-4 is $Z_L$, and the impedance of the capacitor 12-5 is $Z_C$. As a result, the capacitor 12-5 filters the FG signal generated in the noise-suppressing coil 12-4, and allows only the noise c (refer to FIG. 6) to pass; the noise c generated in the noise-suppresing coil 12-4 being cancelled by the noise c generated in the FG coil 12-3, and only the FG signal generated in the FG coil 12-3 being outputted to the FG signal output terminals 13 and 14. That is, a high quality FG signal free of noise can be obtained.

As described above, this invention makes it possible to obtain a high quality FG signal without recourse to a means for magnetically shielding the revolution-detecting generator portion to separate from the motor portion, leading to reduction in the size and manufacturing cost of miniature motors.

What is claimed is:

1. A miniature motor having a revolution-detecting generator comprising a miniature motor with a stator equipped with a permanent magnet for forming a field, and a rotor having a rotor winding wound on a rotor core, constructed so that electric current is fed to said rotor winding via a commutator which makes sliding contact with current-feeding brushes held by a brush holder fixedly fitted to an end plate, and a revolution-detecting generator consisting of a frequency generator mounted on said rotor, made of a soft magnetic material and having a plurality of magnetic-pole serrations on an outer periphery thereof, a frequency generator stator coming in contact with the inner circumferential surface of a motor housing and having on an inner periphery thereof a plurality of magnetic-pole serrations disposed in such a manner as to face said frequency generator rotor magnetic-pole serrations, a permanent magnet for forming a magnetic field between said frequency generator rotor magnetic-pole serrations and said frequency generator stator magnetic-pole serrations, and a frequency-detecting coil for receiving changes in said magnetic field between said frequency generator rotor and stator magnetic-pole serrations and generating an induced voltage proportioanal to rotor revolution; the improvement comprising a noise-suppressing coil wound in a lapped state with said frequency-detecting coil; said frequency detecting coil and said noise-suppressing coil being connected in a reverse phase; and said noise-suppressing coil connected in series with a high pass filter and said noise-suppressing coil and said high pass filter are connected in parallel with said frequency-detecting coil.

2. A miniature motor with a revolution-detecting generator as set forth in claim (1) wherein said high-pass filter is such that "$|Z_L| >> |Z_C|$" in the noise frequency region, and
"$|Z_L| << |Z_C|$" in a frequency-detecting signal frequency region where $Z_L$: impedance of noise-suppressing coil
$Z_C$: impedance of high-pass filter.

3. A miniature motor with a revolution-detecting generator as set forth in claim (1) wherein said high-pass filter is a capacitor.

4. A miniature motor, comprising a stator equipped with a permanent magnet for forming a field; a rotor having a rotor winding wound on a rotor core; a commutator arrangement for feeding electric current to said rotor winding, said commutator making sliding contact with current feeding brushes held by a brush holder fixedly fitted to an end plate of the motor; a revolution-detecting generator including an FG rotor mounted adjacent said rotor, said FG rotor being formed of soft magnetic material and including a plurality of serrations on an outer periphery thereof; an FG stator supported by an inner circumferential surface of a motor housing, said FG stator having a plurality of magnetic-pole serrations positioned facing said FG rotor magnetic-pole serrations; a permanent magnet for forming a magnetic field between said FG rotor magnetic-pole serrations and said FG stator magnetic-pole serrations; a frequency detecting coil for inducing current in response to changes in magnetic field between said FG rotor and said FG stator magnetic-pole serrations and generating an induced voltage proportional to FG rotor revolution; a noise-suppressing coil wound in a lapped state with respect to said frequency-detecting coil, said frequency-detecting coil and said noise-suppresing coil being connected in a reverse phase with said noise-suppressing coil being connected in series with a high-pass filter and said noise-suppressing coil and said high-pass filter being connected in parallel with said frequency-detecting coil.

5. A miniature motor with a revolution-detecting generator as set forth in claim (4) wherein said high-pass filter is such that "$|Z_l| >> |Z_C|$" in the noise frequency region, and
"$|Z_L| << |Z_C|$" in a frequency-detecting signal frequency region where $Z_L$: impedance of noise-suppresing coil
$Z_C$: impedance of high-pass filter.

6. A miniature motor with a revolution-detecting generator as set forth in claim (4) wherein said high-pass filter is a capacitor.

* * * * *